Jan. 19, 1943. C. H. PETER ET AL 2,309,010

DE-ICING MECHANISM

Filed May 3, 1941 2 Sheets-Sheet 1

INVENTORS
Carl Peter
Edward C. Boos

BY John P. Chandler
their Attorney

Jan. 19, 1943. C. H. PETER ET AL 2,309,010

DE-ICING MECHANISM

Filed May 3, 1941 2 Sheets-Sheet 2

INVENTORS
Carl Peter
Edward C. Boos
BY John P. Chandler
their Attorney

134 ...earch Room

Patented Jan. 19, 1943 2,309,010

UNITED STATES PATENT OFFICE 2,309,010

DEICING MECHANISM

Carl H. Peter, Jersey City, and Edward C. Boos, Maywood, N. J.

Application May 3, 1941, Serial No. 391,642

9 Claims. (Cl. 244—134)

This invention relates to new and useful improvements in devices for preventing the accumulation of ice on airplane wings and on other parts of an aircraft, and relates more particularly to a novel means for causing the removal of any accumulated ice by means of heat generated through friction.

Three general methods have heretofore been employed for preventing ice formation on aircraft, the first and most generally used consisting in the application of a flexible, inflatable element or "boot" to the leading edge of the wing, the ice formation being broken up by alternately inflating and deflating the element. The most serious objection to this type of device lies in the fact that the element is wholly positioned on the extension of the wing, and creates, even while inoperative, a certain measure of drop, and also constitutes a distortion of the airfoil.

A second and less successful method consists in providing a sectional formation of the skin at the leading edge and then employing vibrating or agitating means for moving the several sections relative to each other, thus breaking up the ice layer. The resulting wing is less rigid than a wing formed with a fixed leading edge, and the method is generally objectionable. A third method consists in directing heat from the motor exhaust against the leading edge and thus melting the ice. This method, also, has not proven completely satisfactory, particularly since the heat is lost before it reaches the wing tips, and an accumulation of ice adjacent to the tips is frequently the cause of fatal accidents.

The principal object of the present invention is to provide a device of the character described which is positioned wholly within the wing, thus leaving the airfoil entirely clear and unobstructed. Another important object of the present invention is to provide a novel device wherein heat will be generated through friction at closely spaced points along the leading edge of the wing, including the full tip section, the preferred embodiment of the invention including a shaft journalled within the wing adjacent to and substantially parallel with the leading edge thereof. In many instances a shaft is positioned in each wing, each shaft being rotated by a suitable motor mounted either in the wing adjacent to the fuselage or in the fuselage itself. A plurality of heat-generating elements are keyed to the shaft at spaced points thereon, each of such rotatable heat-generating elements engaging a block or heat-transfer element affixed to the inner surface of the skin forming the leading edge of the wing. The outer surface of each block is shaped to fit the concave curvature of such skin along the leading edge, and the inner surface of the block is concavely curved and corresponds to the arc of the circle described by the rotating heat-generating element.

In the preferred embodiment of the invention, the heat-generating element comprises a specially formed needle-bearing structure, and the block may be considered as the outer race of the bearing, except, of course, that it has no strict bearing function. The individual needle-bearing members are spaced from the inner race of the needle-bearing structure, and are rotatably supported only at their terminals. Thus, the outer periphery of each needle-bearing member engages the block or segmental outer race during this rotation and imparts sufficient heat thereto and to the skin area adjacent the block to melt any accumulated ice on the outer surface of the skin. By providing the aforesaid needle-bearing structures the load on the rotating shaft is reduced to a minimum, although there is sufficient friction to generate a rather considerable quantity of heat, depending, of course, upon the speed at which the shaft is rotated. The outer end of each shaft is provided with a flexible shaft-extension which is suitably journalled at spaced points around the curved tip of the wing, and the needle-bearing structures located on the flexible shaft are similar to those positioned adjacent to the straight section, except that each needle-bearing member is convexly curved in longitudinal section to fit the curvature of the interior surface of the wing tip.

It will thus be apparent that another object of the invention is the provision of a wing de-icing mechanism of the character described which will operate with a very small load, and will be exceedingly light in weight. A still further object of the invention is the provision of a wing de-icing device which does not distort the airfoil of the wing, such as results from the use of the inflatable "boot" previously mentioned, and the wing is thus possessed of greater lifting qualities and has less drop. Still another object of the invention is the provision of a device of this character which is positioned wholly within the wing and thus forms no externally disposed obstruction on the wing.

It will also be apparent that another and principal object of the present invention is the provision of a novel and improved type of needle-bearing structure which will quickly generate an approved amount of heat through rotation, which heat may be effectively utilized for any desired purpose. The amount of heat generated is variable within most any desired limits, and depends entirely upon the speed of rotation of the shaft. As applied to the leading edge of an airplane wing or to any other desired portion of an aircraft, the quantity of heat generated in any given area may be easily determined by placing thermometers in such areas.

Figures 1, 2:
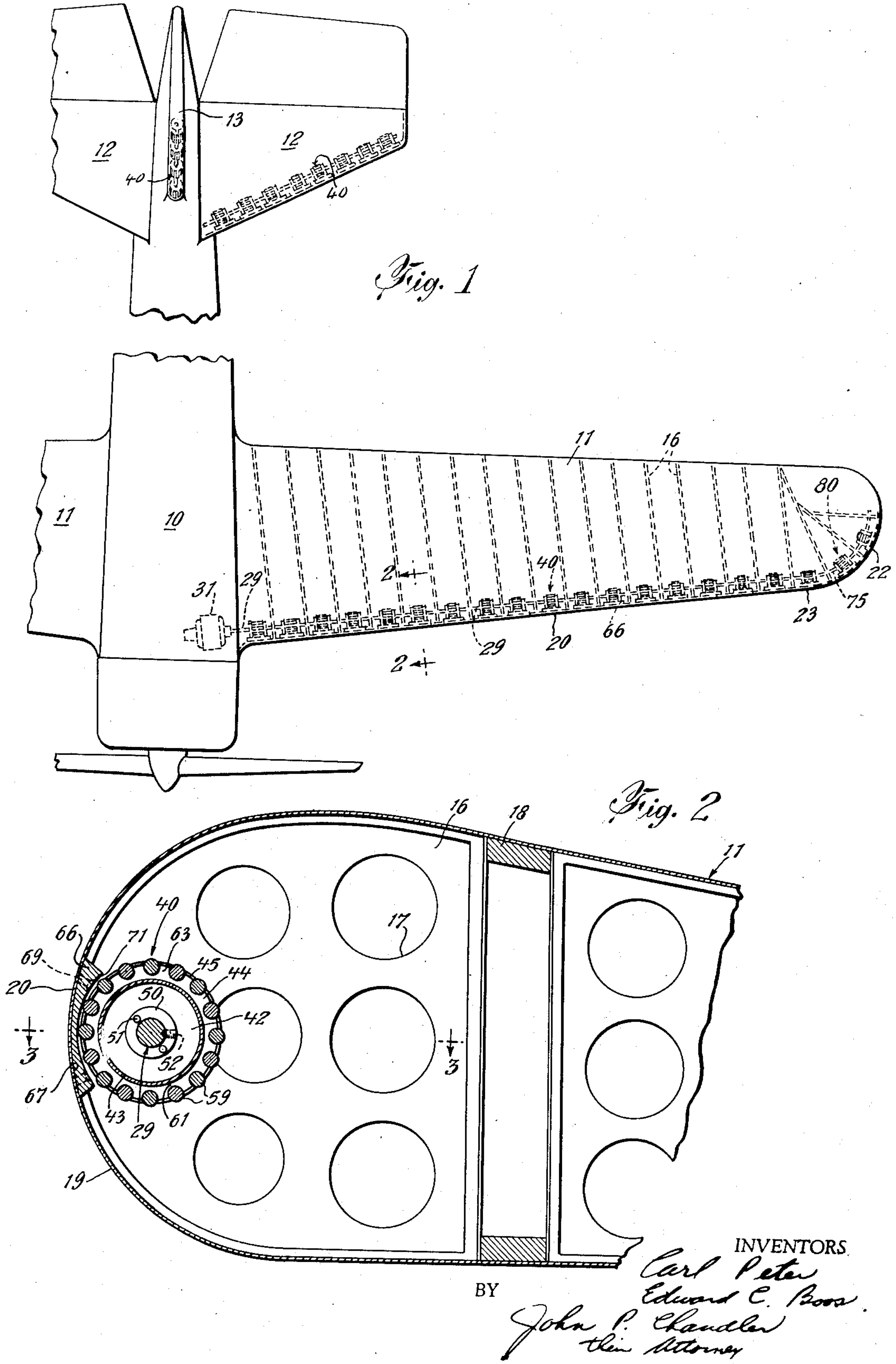
Fig. 1 is a broken top plan view of an airplane, the preferred embodiment of the invention being applied to the leading edge of the wing and the leading edges of the horizontal and vertical stabilizers and being shown in broken lines.
Fig. 2 is an enlarged broken vertical section taken on line 2—2 of Fig. 1.

A conventional aircraft is shown in Fig. 1 and comprises a fuselage 10, wings 11, horizontal stabilizers 12, and a vertical stabilizer 13. The wing is of the usual construction and comprises a plurality of suitably spaced ribs 16 having a plurality of lightening holes 17 therein. The wing also includes the usual longitudinal spars 18 and the skin 19 which extends completely around the leading edge 20, all as is well known in the art. The tip of each wing is curved, as shown at 22, such curvature beginning at or near point 23.

The forward portions 21 of ribs 16 lying between the fuselage and point 23 are of increased thickness and are formed with aligned apertures 25 adjacent to, but spaced from, the leading edge 20, and within each aperture is an adjustable support 24 for the outer race 26 of a ball-bearing structure, such race being frictionally secured within an aperture in the support, or it may be secured by any other means well known in the art. The position of the support relative to the leading edge of the wing is adjusted by means of a screw 28. Inner race 27 of the bearing structure supports a shaft 29, which extends the full length of the wing from the fuselage to, or adjacent to, point 23. This shaft is rotated by means of a motor 31 located in the fuselage, and the shaft may be of one continuous length, or it may be formed in separate sections suitably joined together.

A wing is normally formed with its thickest portion adjacent to the fuselage and tapers down as it approaches the tip. Accordingly, the several specially formed needle-bearing structures are made progressively smaller to conform to the lessened arc formed by the leading edge, and it is also preferred to progressively reduce the diameter of shaft 29 to receive the progressively smaller needle-bearing structures. Thus, in Fig. 3, shaft 29 is shown as being formed with a section 34 of larger diameter, a section 35 of somewhat reduced diameter, and a terminal section 36 having a still smaller diameter.

Figures 3, 4, 5:
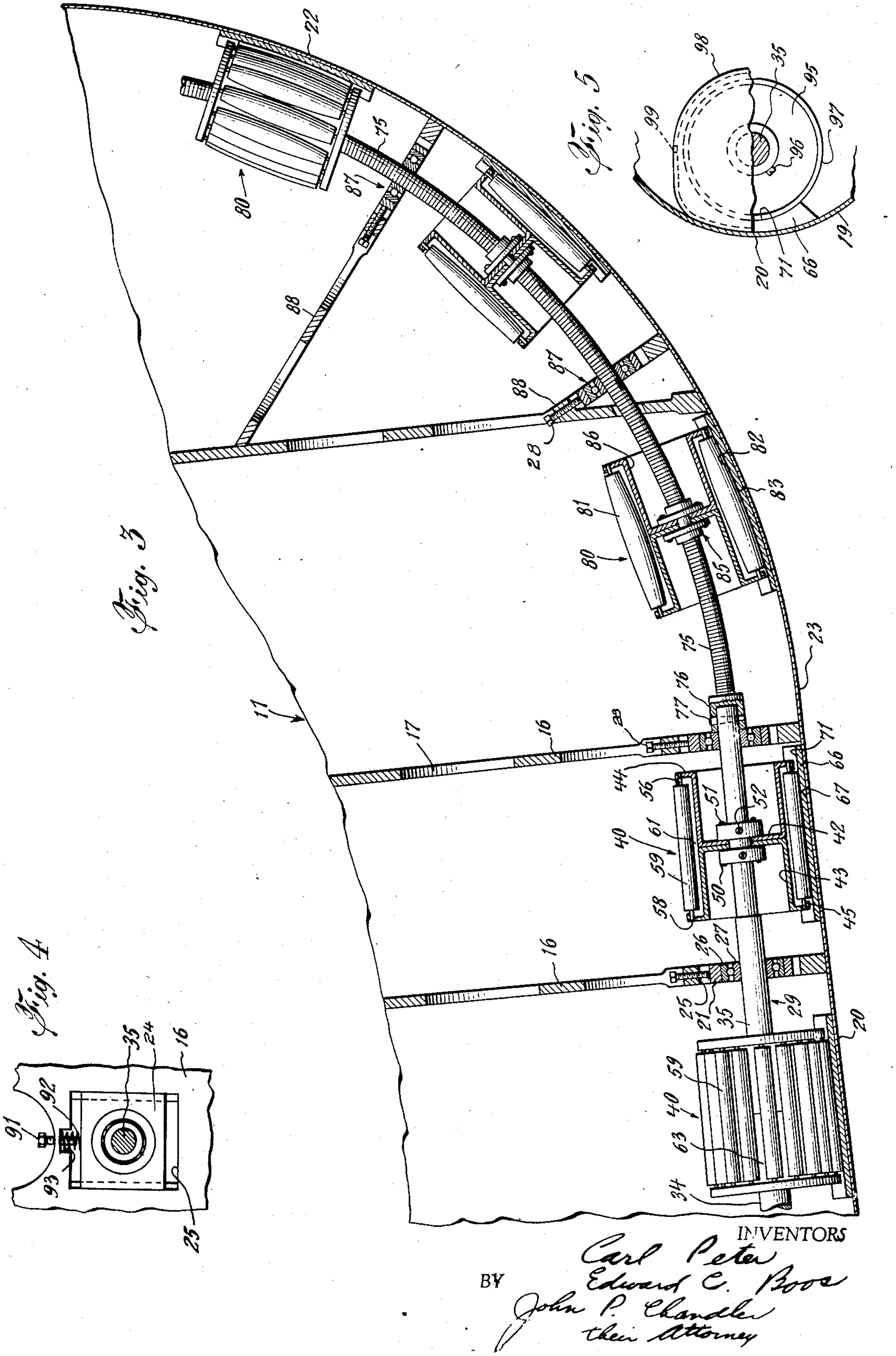
Fig. 3 is a broken horizontal section taken on line 3—3 of Fig. 2, the view showing a portion of the tip of the wing.
Fig. 4 shows a modified form of support for the shaft.
Fig. 5 is a broken side elevation of a modified form of heat-generating element.

The details of the needle-bearing structures 40 positioned adjacent to the straight portion of the leading edge of the wing are shown in Figs. 2 and 3. The inner race of each structure comprises a pair of shells having meeting hub portions 42 formed integrally with outwardly extending cylindrical portions 43, outwardly turned flange portions 44, and inwardly turned flange portions 45. Hub portions 42 are formed with central apertures 48 which in Fig. 3 are shown as being received on portion 36 of shaft 29. The two hub portions are secured in meeting engagement by means of opposed collars 50 which are joined together by means of rivets 51, the collars being keyed to the shaft by means of a set screw 52, or by an other conventional means.

Portion 44 of the shell is formed with a plurality of spaced apertures 56 which may extend completely through the wall or may, if desired, extend only partially through such wall. These apertures support the reduced bearing portions 58 of the needle bearings 59. The inner periphery of each needle bearing 59 is slightly spaced from the outer surface of portion 43 of the shell, and if any lubrication is required the lubricant may reside in such portion which is designated as 61. The several needle bearings 59 are slightly spaced, as indicated at 63, and the width of such space relative to the diameter of the needle bearings is a matter of choice. The outer race of each bearing comprises a specially formed metallic strip 66 slightly longer than each bearing structure 40 and having an outer surface 67 shaped to closely fit the inner surface of the skin 19 along its leading edge 20, such strip being secured to the inner surface of the skin by means of counter-sunk rivets or screws 69. The inner surface 71 of strip 66 is concavely curved, and represents the arc of the circle described by the rotating needle bearings.

The length of each needle-bearing structure and the spacing of the several structures along the leading edge of the wing is a matter of choice. In Fig. 1, one such structure is shown as being positioned between each pair of adjacent ribs. If desired, two or more structures may be placed between each two ribs, or any other convenient arrangement may be made. For normal operation, however, it is not necessary that each adjacent pair of bearing structures be placed closely together, for the reason that the skin, which is normally made of aluminum, is a good conductor of heat and such heat, in addition to being conducted circumferentially of the leading edge, will travel longitudinally in the areas between the several structures. The several needle-bearing structures used for creating heat around the curved tip of the wing are clearly shown in Figs. 1 and 3.

A flexible shaft 75 is formed with a collar 76 which is connected with the outer terminal of shaft section 36 by means of a pin 77. Each needle-bearing structure 80 for such curved section is similar to the structures 40 positioned along the straight section of the edge, with the exception of the fact that the needle-bearings 81 are convexly curved, and the inner surface 82 of the outer race member 83 is concavely curved in a horizontal section, as shown in Fig. 3. Means 85 for securing the shells 86 forming the inner race members are largely similar to the means for securing the needle-bearing structures 40 to the solid shaft. The flexible shaft 75 is further journalled at spaced points in roller-bearing structures 87 mounted in diagonally disposed ribs 88 formed in the tip section. Shaft 29 may be of one piece, as illustrated, and may be solid or hollow, as desired. It may also be made in a plurality of sections suitably joined together. Likewise, a plurality of solid or hollow shaft sections may be substituted for the flexible shaft 75, and appropriate bevel gears positioned at the 13 Search Room ends of the sections to drive the entire shaft throughout its length.

In Fig. 4 a slight modification in the shaft-supporting means is illustrated wherein a set screw 91 limits rearward movement of shaft support 24, and a coil compression spring 92 of sufficient strength is positioned at its rearward end in a recess 93 in rib 16 and engages support 24 and yieldingly urges the shaft and the heat-generating element forward. In Fig. 5 a modified form of heat-generating element is shown, and includes the shaft 35, the segmental outer race or heat-receiving block 66, and the skin 19 over leading edge 20, all as in the preferred embodiment. In this instance, however, the rotatable member is a drum 95 keyed to shaft 35 by means of a set screw 96, the outer surfaces 97 of the drum engaging the inner concave surface 71 of block 66. With this structure some lubrication is desired, and accordingly the entire heat-generating element is enclosed within a casing 98 having a lubrication opening 99 in the upper wall thereof.

It will be appreciated that the construction of the preferred form of rotating, heat-generating elements 40, shown in Figs. 1, 2 and 3, may be modified such as by forming the journal supports for the needle bearings as two discs mounted in spaced relation by means of a tubular section, the discs having central apertures to receive the shaft. Also, the outer race may be a complete cylindrical element if desired. Furthermore, the diameter of the needle-bearing structure and of the individual needles relative to the wing thickness illustrated may be varied considerably, depending upon the results desired. These are only a few of the changes and modifications that are within the scope of the invention, as defined by the appended claims.

What we claim is:

1. An airplane wing de-icing mechanism comprising a rotatable shaft journalled within the wing adjacent to an edge thereof, means for rotating such shaft, a plurality of needle-bearing structures keyed to said shaft in spaced relationship, and a plurality of segmental heat-receiving blocks affixed in heat-conducting relationship to the inner surface of the skin, the inner surface of each block being engaged by the rotating needle bearings, each needle-bearing structure including a shell mounted on the shaft and formed with annular flange portions at each end thereof, said flange portions having a plurality of spaced apertures therein forming journals for each end of the needle bearings.

2. An airplane wing de-icing mechanism comprising a rotatable shaft journalled within the wing adjacent to the leading edge thereof, means for rotating such shaft, a plurality of needle-bearing structures keyed to said shaft in spaced relationship, and a plurality of segmental blocks affixed in heat-conducting relationship to the inner surface of the wing, the inner surface of each block being engaged by the rotating needle bearings, each needle-bearing structure including a support mounted on the shaft and formed with annular flange portions at each end thereof, said flange portions forming journals for each end of the needle bearings.

3. An airplane wing de-icing mechanism comprising a rotatable shaft journalled within the wing adjacent to the leading edge thereof, and extending through the tip section thereof, means for rotating such shaft, a plurality of needle-bearing structures keyed to said shaft in spaced relationship, and a plurality of segmental bearing members affixed to the inner surface of the wing covering in heat-conducting relationship, the inner surface of each bearing member being engaged by the rotating needle bearings, each needle-bearing structure including a generally cylindrical shell mounted on the shaft and formed with annular flange portions at each end thereof, said flange portions having a plurality of spaced apertures therein forming journals for each end of the needle bearings, and means for yieldably and adjustably urging said needle-bearing structures against the bearing members.

4. In a de-icing device for an airfoil, the combination of a plurality of fixed bearing members in heat-conducting relation with the airfoil surface to be de-iced, means associated with the bearing members for generating heat through friction, comprising a plurality of heat-generating elements rotatably mounted within the airfoil, said elements being generally cylindrical in shape and having a portion of their outer peripheries in contact with the fixed bearing members during rotation, and means for rotating said elements.

5. In a de-icing device for an airfoil, the combination of a plurality of fixed bearing members in heat-conducting relation with the airfoil surface to be de-iced, means associated with the bearing members for generating heat through friction, said means comprising a rotatable shaft journalled adjacent to, but spaced from, the bearing members, a plurality of heat-generating elements rotatably carried by said shaft, said elements being generally cylindrical in shape and having a portion of their outer peripheries in contact with the bearing members during rotation, and means for rotating the shaft.

6. In a de-icing device for an airfoil, the combination of a plurality of fixed bearing members positioned in heat-conducting relation with the airfoil surface to be de-iced, means associated with the bearing members for generating heat through friction, comprising a rotatable shaft journalled adjacent to, but spaced from, the bearing members, a plurality of heat-generating elements comprising needle-bearing structures rotatably carried by said shaft, a portion of the outer periphery of each needle-bearing structure being in contact with the fixed bearing members during rotation, and means for rotating the shaft.

7. In a de-icing device for an airfoil, the combination of a rotatable shaft extending along the interior of, but spaced from, the airfoil to be de-iced, means for rotating the shaft, a plurality of spaced, heat-generating elements carried by the shaft comprising generally cylindrical members keyed to the shaft, fixed bearing members in heat-conducting relation with the airfoil surface to be de-iced, the rotatable heat-generating elements being in contact with the fixed bearing members to impart heat thereto through friction upon rotation, and means for varying the pressure of the heat-generating elements against the bearing members.

8. In a de-icing device for an airfoil, the combination of a rotatable shaft extending along the interior of, but spaced from, the airfoil to be de-iced, means for rotating the shaft, a plurality of spaced, heat-generating elements carried by the shaft comprising needle-bearing structures keyed to the shaft, and fixed bearing members in heat-conducting relation with the airfoil surface to be de-iced, the rotatable heat-generating elements being in contact with the fixed bearing members to impart heat thereto upon rotation.

9. In a de-icing device for an airplane wing, the combination of a rotatable shaft extending along the interior of the wing, adjacent to, but spaced from, the leading edge thereof, a shaft extension extending through a portion of the wing tip section, means for rotating the shaft, a plurality of spaced, heat-generating elements carried by the shaft comprising generally cylindrical members keyed to the shaft, and fixed bearing members in heat-conducting relation with the airfoil surface to be de-iced, the rotatable heat-generating elements being in contact with the fixed bearing members to impart heat thereto, through friction, upon rotation.

CARL H. PETER.
EDWARD C. BOOS.